(12) United States Patent
Shan

(10) Patent No.: US 11,256,145 B2
(45) Date of Patent: Feb. 22, 2022

(54) FLAT PANEL DISPLAY

(71) Applicant: HKC Corporation Limited, Guangdong (CN)

(72) Inventor: JianFeng Shan, Chongqing (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 16/648,598

(22) PCT Filed: Oct. 30, 2017

(86) PCT No.: PCT/CN2017/108266
§ 371 (c)(1),
(2) Date: Mar. 18, 2020

(87) PCT Pub. No.: WO2019/056483
PCT Pub. Date: Mar. 28, 2019

(65) Prior Publication Data
US 2020/0218107 A1 Jul. 9, 2020

(30) Foreign Application Priority Data
Sep. 19, 2017 (CN) .......................... 201710845035.9

(51) Int. Cl.
*G02F 1/1339* (2006.01)
*G09G 3/36* (2006.01)

(52) U.S. Cl.
CPC ....... *G02F 1/13394* (2013.01); *G09G 3/3688* (2013.01); *G09G 2320/0233* (2013.01)

(58) Field of Classification Search
CPC ........ G02F 1/13394; G09G 2320/0233; G09G 3/3688
(Continued)

(56) References Cited

U.S. PATENT DOCUMENTS

2005/0243261 A1* 11/2005 Chiang ............... G02F 1/13394
349/155
2007/0097312 A1* 5/2007 Park ..................... G02F 1/13394
349/155
(Continued)

FOREIGN PATENT DOCUMENTS

| CN | 1420997 A | 5/2003 |
| CN | 1888954 A | 1/2007 |

(Continued)

OTHER PUBLICATIONS

CN 1420997 A includes an English language translation as p. 1, and an English machine translation as pp. 2-8.
(Continued)

*Primary Examiner* — Charles S Chang
(74) *Attorney, Agent, or Firm* — Muncy, Geissler, Olds & Lowe, P.C.

(57) ABSTRACT

A flat panel display is provided. The flat panel display comprises: two substrates disposed opposite each other, a display medium disposed between the substrates, and a photo spacer region where a plurality layout units are distributed, and the layout units are disposed between the substrates. An area of one of the layout units at a central portion of the substrate is larger than an area of another layout unit at a peripheral portion of the substrate.

18 Claims, 9 Drawing Sheets

(58) Field of Classification Search
USPC .................................................. 349/155–157
See application file for complete search history.

(56) References Cited

U.S. PATENT DOCUMENTS

| | | | | |
|---|---|---|---|---|
| 2008/0158496 | A1* | 7/2008 | Kim ..................... | G02F 1/13394 349/151 |
| 2009/0046239 | A1* | 2/2009 | Watanabe ........... | G02F 1/13394 349/157 |
| 2013/0050619 | A1* | 2/2013 | Kim ..................... | G02F 1/13394 349/106 |
| 2016/0291374 | A1* | 10/2016 | Fan ...................... | G02F 1/13394 |
| 2016/0349563 | A1 | 12/2016 | Shina | |
| 2019/0033628 | A1* | 1/2019 | Kawata ................. | G02F 1/0107 |

FOREIGN PATENT DOCUMENTS

| | | |
|---|---|---|
| CN | 1991488 A | 7/2007 |
| CN | 101364013 A | 2/2009 |
| CN | 102117146 A | 7/2011 |
| CN | 202267803 U | 6/2012 |
| CN | 102681180 A | 9/2012 |
| CN | 102890367 A | 1/2013 |
| CN | 104536630 A | 4/2015 |
| CN | 105137663 A | 12/2015 |
| CN | 105404052 A | 3/2016 |
| CN | 105759482 A | 7/2016 |
| CN | 106405945 A | 2/2017 |
| CN | 107450788 A | 12/2017 |
| CN | 107479261 A | 12/2017 |
| CN | 107515495 A | 12/2017 |
| CN | 107561759 A | 1/2018 |
| JP | 2010-139573 A | 6/2010 |

OTHER PUBLICATIONS

CN 1888954 A includes an English language translation as p. 1, and an English machine translation as pp. 2-9.
CN 1991488 A includes an English language translation as p. 1.
CN 101364013 A includes an English language translation as p. 1.
JP 2010-139573 A includes an English language translation as p. 1.
CN 102117146 A includes an English language translation as p. 1, and an English machine translation as pp. 2-11.
CN 202267803 U includes an English language translation as p. 1.
CN 102681180 A includes an English language translation as p. 1, and an English machine translation as pp. 2-25.
CN 102890367 A includes an English language translation as p. 1.
CN 104536630 A includes an English language translation as p. 1, and an English machine translation as pp. 2-15.
CN 105137663 A includes an English language translation as p. 1, and an English machine translation as pp. 2-14.
CN 105404052 A includes an English language translation as p. 1, and an English machine translation as pp. 2-19.
CN 105759482 A includes an English language translation as p. 1, and an English machine translation as pp. 2-12.
CN 106405945 A includes an English language translation as p. 1, and an English machine translation as pp. 2-9.
CN 107450788 A includes an English language translation as p. 1, and an English machine translation as pp. 2-20.
CN 107479261 A includes an English language translation as p. 1, and an English machine translation as pp. 2-20.
CN 107515495 A includes an English language translation as p. 1, and an English machine translation as pp. 2-20.
CN 107561759 A includes an English language translation as p. 1, and an English machine translation as pp. 2-20.
International Search Report (with English translation) and Written Opinion dated Jun. 15, 2018 issued in corresponding Application No. PCT/CN2017/108266.

* cited by examiner

FIG. 7B
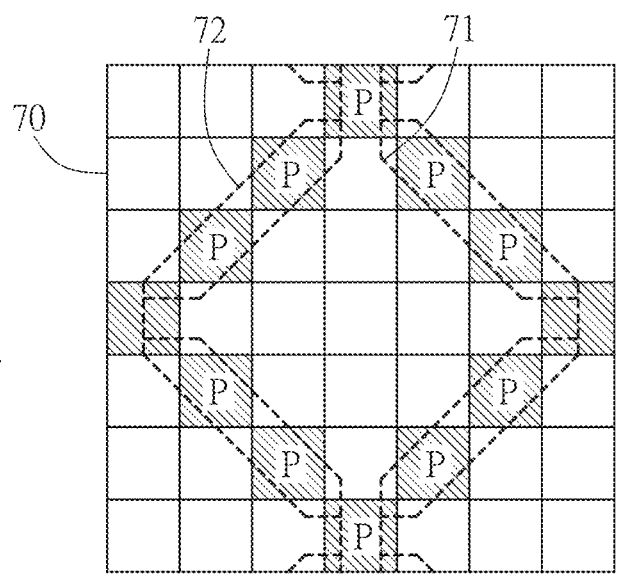
FIG. 8A
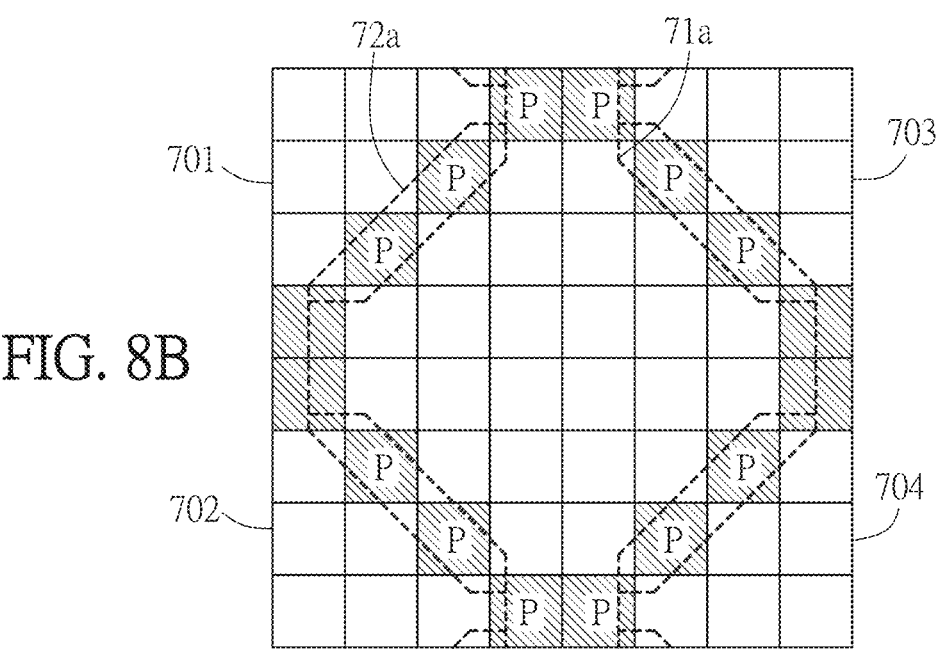
FIG. 8B

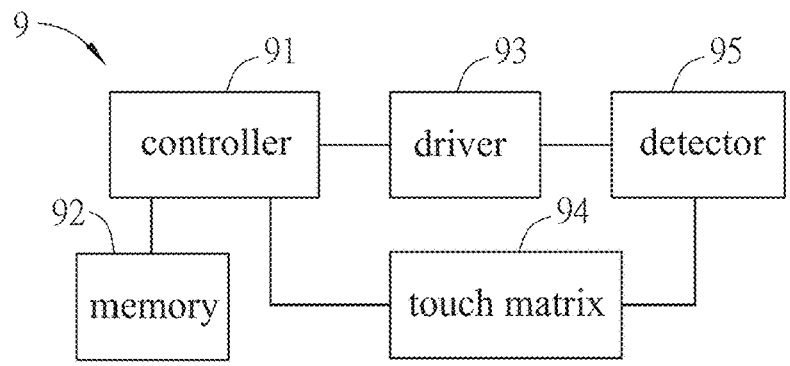
FIG. 10A
FIG. 10B
FIG. 10C
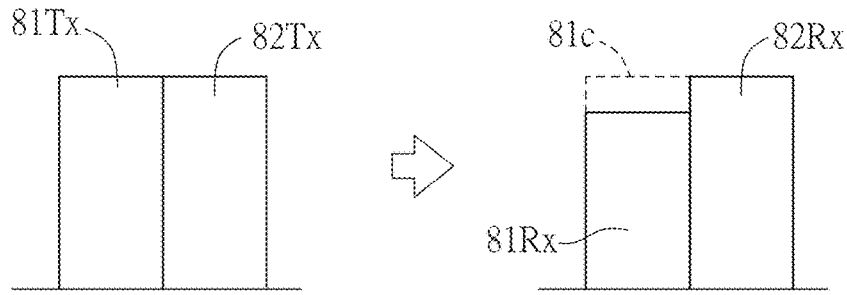
FIG. 11A
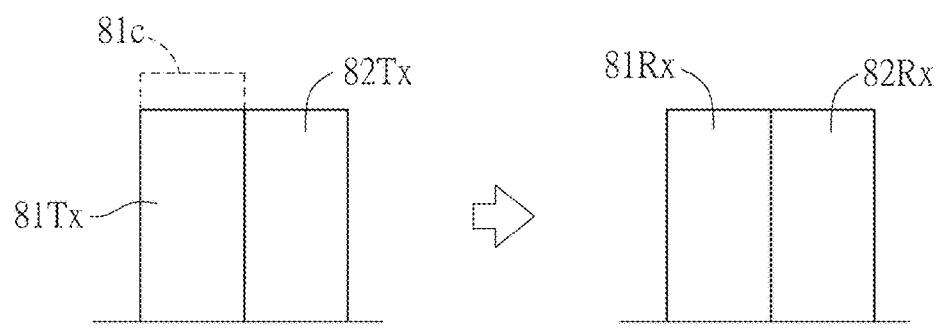
FIG. 11B

FLAT PANEL DISPLAY

BACKGROUND

Technical Field

This disclosure relates to a display device, and more particularly to a flat panel display.

Related Art

Flat panel displays have been widely applied to various fields. A liquid crystal display device having the predominant properties, such as the thin and light properties, the low power consumption and the radiationless property, has gradually replaced the conventional cathode ray tube display apparatus, and has been applied to various electronic products, such as a mobile phone, a portable multimedia apparatus, a notebook computer, a liquid crystal television, a liquid crystal display and the like.

The liquid crystal display device comprises elements comprising a display panel. An active matrix type liquid crystal display panel is an ordinary display panel at present and comprises an active matrix substrate, opposing substrates, and a liquid crystal layer disposed between the two substrates. A plurality of row wires, column wires and pixels are disposed at the active matrix substrate. The pixel contains a pixel drive element. The pixel drive elements are connected to the row wires and the column wires. The ordinary pixel drive element is a thin film transistor. The row wire and the column wire are usually metal wires.

In order to separate the active matrix substrate from the opposing substrates, a photo spacer is provided between the two substrates. The photo spacer affects the alignment of the liquid crystal layer. In addition, the configuration number or method of the photo spacers also affects the display quality, or even the touch detection of the touch display device is affected.

SUMMARY

In view of the deficiencies of the prior art, the inventor obtained this disclosure after the research and development. An objective of this disclosure is to provide a flat panel display to improve the non-uniform distribution of the photo spacers and enhance the display efficiency.

This disclosure provides a flat panel display, comprising two substrates disposed opposite to each other; a display medium disposed between the substrates; and a photo spacer region where a plurality layout units are distributed, and the layout units are disposed between the substrates, an area of one of the layout units at a central portion of the substrate is larger than an area of another layout unit at an peripheral portion of the substrate.

In one embodiment, each layout unit has the same amounts of photo spacers disposed between the substrates.

In one embodiment, the areas of the layout units at two lateral sides of each substrate are the same.

In one embodiment, the area of one of the layout units at a top edge of one of the substrates is larger than the area of another layout unit at a bottom edge of the same substrate.

In one embodiment, the area of one of the layout units at two lateral sides of one of the substrates is larger than the area of another layout unit at a bottom edge of the same substrate.

In one embodiment, the photo spacer region provides a fixed distance between the substrates.

In one embodiment, one of the layout units is constituted by N by N layout subunits disposed in rows and columns.

In one embodiment, in one of the layout units, only one of the layout subunits on the same row is provided with a photo spacer.

In one embodiment, in one of the layout units, only one of the layout subunits on the same column is provided with a photo spacer.

In one embodiment, the display medium is liquid crystal.

In summary, the flat panel display of this disclosure is divided into the layout units with a plurality of photo spacers, the layout units having the same amounts of photo spacers are provided between the substrates, an area of a layout unit at the center of the substrate is larger than an area of a layout unit at the peripheral portion of the substrate, and thus the problem of easier depression at the central portion of the panel can be solved. In addition, the layout units each having the same amounts of photo spacers are provided between the substrate, an area of a layout unit at the top edge of one of the substrate is larger than an area of a layout unit at the bottom edge of the same substrate, and the structural strength of the lower edge of the display device can be improved. With the above-mentioned configuration, the problems that the photo spacers are distributed non-uniformly and the flat panel display easily produces defective pixels can also be improved.

BRIEF DESCRIPTION OF THE DRAWINGS

The accompanying drawings are included to provide a further understanding of embodiments of the present application, which constitutes a part of the specification, illustrate embodiments of the present disclosure is used, together and explain the principles of the present disclosure with the description. Apparently, the drawings in the following description are only some embodiments of the present disclosure, those of ordinary skill in the art is concerned, without any creative effort, and may also obtain other drawings based on these drawings. In the drawings:

FIGS. 5A and 5B are schematic views showing the embodiment of the layout unit in FIG. 4.

FIG. 7B is a schematic view showing one embodiment of a compensation table of this disclosure.

FIGS. 8A and 8B are schematic views showing one embodiment of a touch display device of this disclosure.

FIG. 10A is a block view showing one embodiment of a touch display device of this disclosure.

FIGS. 10B and 10C are schematic views showing one embodiment of a compensation table of this disclosure.

FIGS. 11A and 11B are schematic views showing one embodiment of the touch compensation of this disclosure.

DETAILED DESCRIPTION OF THE INVENTION

Figure 1A:
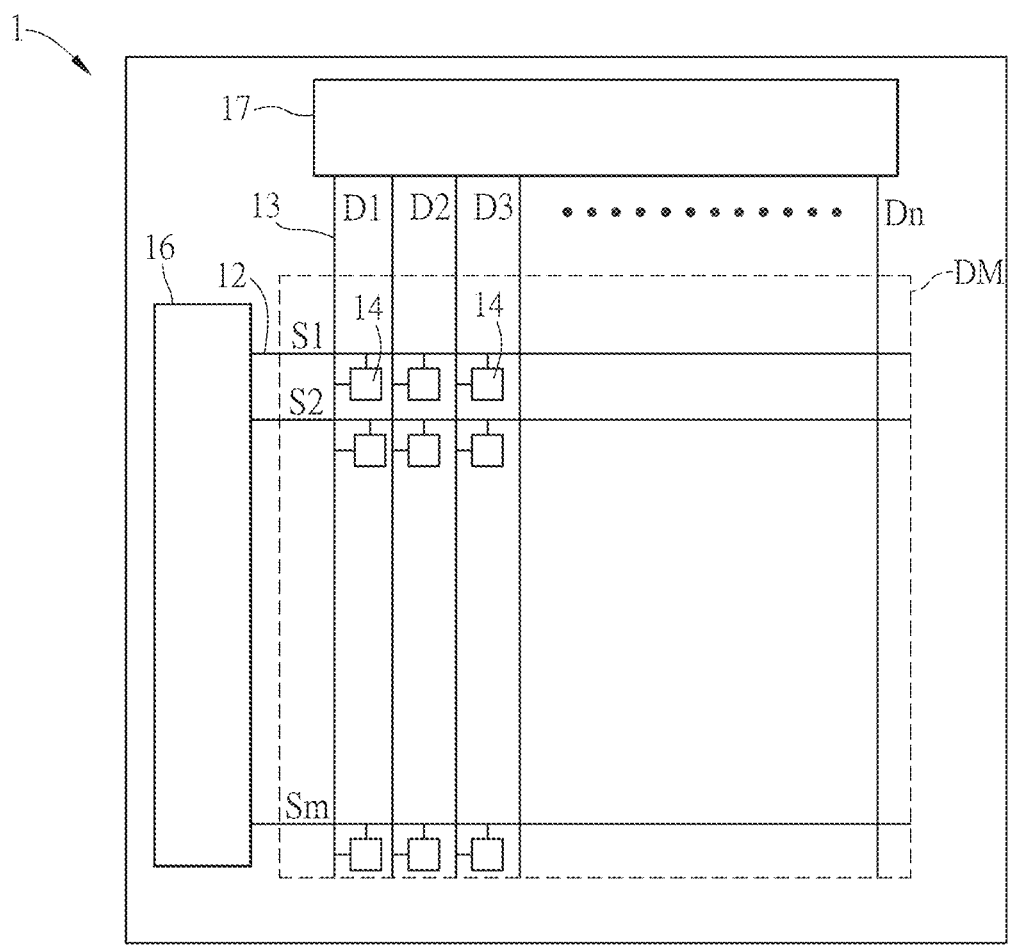
FIG. 1A is a schematic view showing one embodiment of a flat panel display of this disclosure.

Specific structural and functional details disclosed herein are merely representative and are for purposes of describing example embodiments of the present invention. However, the present invention may be embodied in many alternate forms, and should not be interpreted as being limited to the embodiments set forth herein.

In the description of the present invention, it is to be understood that the term "center", "lateral", "upper", "lower", "left", "right", "vertical", "horizontal", "top", "bottom", "inner", "outer" and other indicated orientation or positional relationships are based on the location or position relationship shown in the drawings, and are for convenience of description of the present invention only and to simplify the description, and not indicate or imply that refers to devices or elements must have a specific orientation, the orientation of a particular configuration and operation, therefore, cannot be construed as limiting the present invention. In addition, the terms "first", "second" are used to indicate or imply relative importance or the number of technical features specified implicitly indicated the purpose of description and should not be understood. Thus, there is defined "first", "second" features may be explicitly or implicitly include one or more of the features. In the description of the present invention, unless otherwise specified, the meaning of "more" is two or more. Further, the term "comprising" and any variations thereof, are intended to cover non-exclusive inclusion.

In the description of the present invention, it is noted that, unless otherwise expressly specified or limited, the terms "mounted," "connected to", "connected" are to be broadly understood, for example, may be a fixed connection, may be a detachable connection, or integrally connected; may be a mechanical connector may be electrically connected; may be directly connected, can also be connected indirectly through intervening structures, it may be in communication the interior of the two elements. Those of ordinary skill in the art, be appreciated that the specific circumstances of the specific meanings in the present invention.

The terminology used herein is for describing particular embodiments only and is not intended to limit embodiments to an exemplary embodiment. Unless the context clearly indicates otherwise, singular forms as used herein, "a", "an" are intended to include the plural. It should also be understood that, as used herein the term "comprising" and/or "comprising," as used herein, specify the presence of stated features, integers, steps, operations, elements, and/or components, but do not preclude the presence or addition of one or more other features, integers, steps, operations, elements, components, and/or combinations thereof.

The flat panel display of a preferable embodiment of this disclosure will be further described in detail with reference to FIGS. 1A to 11B, and same unit is represented by the same reference numeral.

Figure 1B:
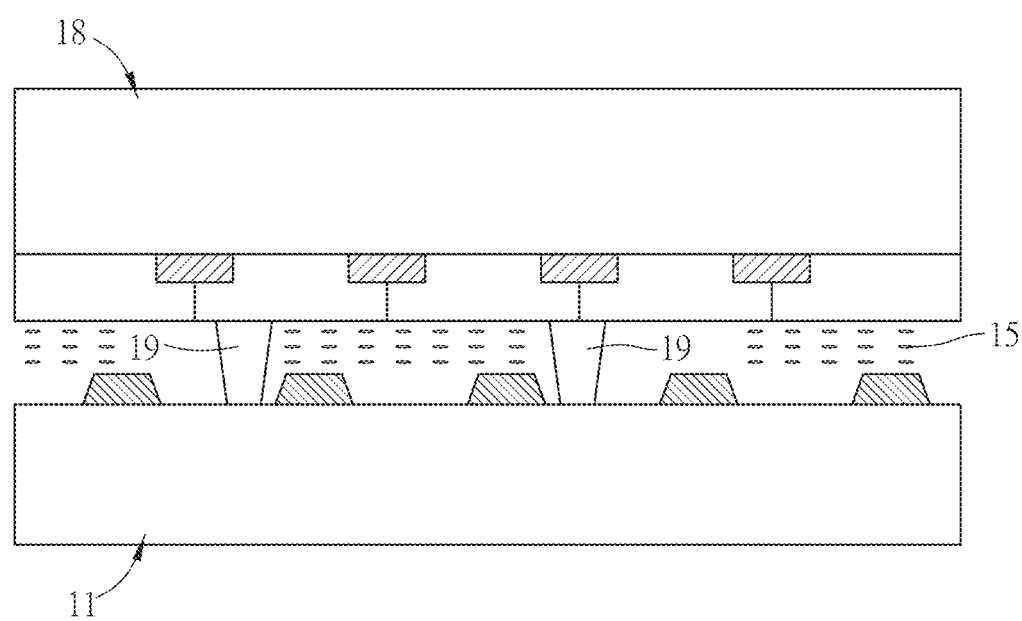
FIG. 1B is a schematic side view showing one embodiment of a flat panel display of this disclosure.

FIG. 1A is a schematic view showing one embodiment of a flat panel display of this disclosure. FIG. 1A shows the top view configuration of a flat panel display. In FIGS. 1A and 1B, a flat panel display 1 comprises a substrate 11, a plurality of row wires 12, a plurality of column wires 13, a plurality of unit pixels 14, an area 16 and an area 17. The row wires 12 and the column wires 13 are interleaved to form a pixel matrix DM, and the unit pixels 14 are disposed inside the pixel matrix DM. The substrate 11 is, for example, an active matrix substrate.

The substrate 11 is, for example, an insulation transparent substrate, and the material thereof may be a rigid material or a flexible material, such as glass or plastic material and the like. The row wire 12 and the column wire 13 are usually metal wires.

The area 16 and the area 17 may be provided with wire drivers for connecting wires. For example, the area 16 is provided with a row driver, the row driver is connected to the row wire 12 and outputs a row drive signal to the row wire 12, the area 17 is provided with a column driver, and the column driver is connected to the column wire 13 and outputs a column drive signal to the column wire 13. Alternatively, the area 16 and the area 17 are not directly provided with the drivers, and are provided with traces or connection pads for connecting the wire drivers. The trace or the connection pad of the area 16 is connected to the row wire 12. The trace or the connection pad of the area 17 is connected to the column wire 13. The row driver and the column driver are respectively electrically connected to the area 16 and the area 17 through a flat cable, a circuit board or the like, and are thus respectively electrically connected to the row wire 12 and the column wire 13, and can output the row drive signal and the column drive signal to the row wire 12 and the column wire 13, respectively.

For example, the row wires 12 are scan lines and comprise a plurality of scan lines S1 to Sm, the row driver is a scan drive circuit, and the row drive signal is a scan drive signal. The column wires are data lines and comprise a plurality of data lines D1 to Dn, the column driver is a data drive circuit, and the column drive signal is a data drive signal. The data lines D1 to Dn and the scan lines S1 to Sm are interleaved to define the plurality of unit pixels 14.

FIG. 1B is a schematic side view showing one embodiment of a flat panel display of this disclosure. As shown in FIG. 1B, a flat panel display 1 comprises a first substrate 11, a second substrate 18, a display medium 15 and a photo spacer region 19. The second substrate 18 is disposed opposite the first substrate 11.

The display medium 15 is disposed between the first substrate 11 and the second substrate 18, and the display medium 15 is, for example, a liquid crystal. The second substrate 18 may be provided with a color filter layer, and the first substrate 11 and the second substrate 18 have assemblies such as alignment films, filters and the like (not shown).

The photo spacer region 19 has photo spacers (PS), the photo spacer region 19 is disposed between the first substrate 11 and the second substrate 18, and a fixed distance is provided between the first substrate 11 and the second substrate 18.

The amount and uniformity of the photo spacer affect the liquid crystal liquidity in the liquid crystal layer, and the stability of the photo spacer also affects the configuration thickness of the liquid crystal layer. In this embodiment, the photo spacer of the photo spacer region 19 is columnar and functions as the support between the first substrate 11 and the second substrate 18.

The photo spacer is, for example, a polymeric resin material, which has better adhesion, heat resistance and light penetration effect. Compared with a ball-shaped photo spacer, the columnar photo spacer has better mechanical strength, does not flow freely and has the light-leakage phenomenon. The columnar photo spacer may be formed on the first substrate 11 by the photo-lithography process. The use of the columnar photo spacer may keep the constant gap between the first substrate 11 and the second substrate 18 may be fixed, and may further utilize the thickness of the photo spacer to adjust the range size of the liquid crystal layer to provide a more flat support to the panel.

Figure 1C:
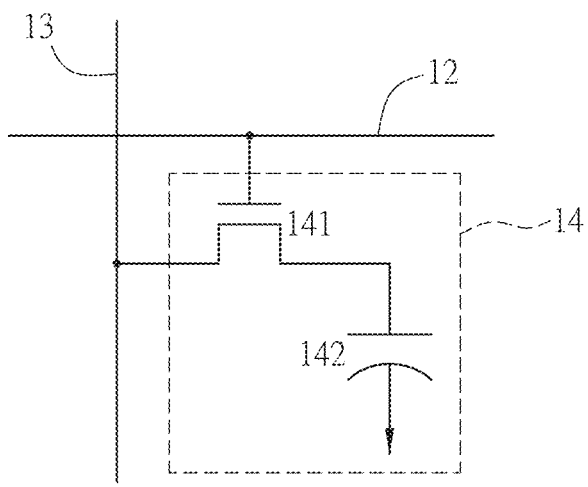
FIG. 1C is a schematic view showing one embodiment of a unit pixel of this disclosure.

FIG. 1C is a schematic view showing one embodiment of a unit pixel of this disclosure. As shown in FIG. 1C, a pixel drive element of the unit pixel 14 comprises a thin film transistor 141 and a pixel capacitor 142. The thin film transistor 141 functions as a switch and has a gate connected to the row wire 12, a source connected to the column wire 13, and a drain connected to the pixel capacitor 142. The scan drive signal on the row wire 12 may control the thin film transistor 141 to turn on so as to enable the data drive signal on the column wire 13 to be written into the pixel capacitor 142.

The pixel capacitor 142 is a liquid crystal capacitor, and consists of two electrodes. Generally speaking, the liquid crystal capacitor comprises a pixel electrode and a common electrode, the drain of the thin film transistor 141 is connected to the pixel electrode, and the common electrode is connected to a common voltage (Vcom). In some embodiments, the voltage value of the common voltage may be 0 volts (ground). When the gate of the thin film transistor 141 is applied with a scan drive signal by the row wire 12 to turn on, the data voltage of the data drive signal on the column wire 13 is applied to the pixel electrode through the thin film transistor 141, so that a voltage difference is generated between the pixel electrode and the common electrode, and the liquid crystal capacitor stores the potential difference written by the drive signal to drive the liquid crystal molecules between two electrodes to rotate.

The materials of the pixel electrode and the common electrode may be, for example but without limitation to, transparent electroconductive materials such as indium-tin oxide (ITO) or indium-zinc oxide (IZO) and the like.

The configurations of the pixel electrode and the common electrode are different in different types of display panels. In terms of a transversal electric field effect display panel, the pixel electrode and the common electrode are formed on the first substrate 11, that is, are formed on the same substrate 11 with the thin film transistor 141. Under this architecture, the second substrate 18 may not form a whole piece of common electrode, so there is more space to form the touch electrode.

In terms of a multi-domain vertical alignment panel or a twisted nematic panel, a whole piece of common electrode is formed on the opposing substrates, the pixel electrode and the thin film transistor 141 are formed on the first substrate 11, and the pixel electrode on the first substrate 11 and the common electrode on the opposing substrates constitute a liquid crystal capacitor.

FIG. 1C illustrates a basic element of a typical unit pixel, so only one thin film transistor 141 and one pixel capacitor 142 are shown. In other implementation aspects, the unit pixel may also comprise a plurality of thin film transistors and other capacitor elements. In one embodiment, a storage electrode (not shown) may be further provided in each of the pixels, and forms an auxiliary capacitor together with the second electrode.

Figure 2A:
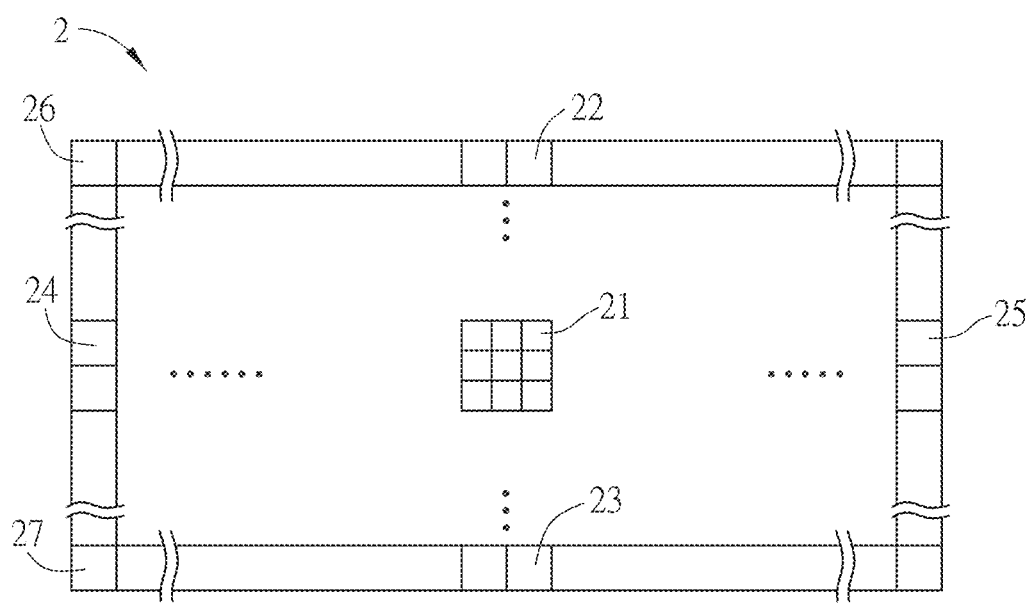
FIGS. 2A to 2C are schematic views showing one embodiment of a photo spacer region of this disclosure.

FIG. 2A is a schematic view showing one embodiment of a photo spacer region of this disclosure. FIG. 2A shows the top view configuration of the photo spacer region on the plane of the substrate of the flat panel display. As shown in FIG. 2A, a photo spacer region 2 has a plurality of layout units 21 to 27, and the layout units 21 to 27 are distributed, and the layout units are disposed, for example, between the first substrate 11 and the second substrate 18 in FIG. 1B.

The layout units 21 to 27 have the photo spacers as shown in FIG. 1B between the first substrate 11 and the second substrate 18, and a fixed distance is provided between the first substrate 11 and the second substrate 18. Each layout unit 21 to 27 has the same amounts of photo spacers, and the photo spacers of the layout units 21 to 27 function as the supports between the first substrate 11 and the second substrate 18 to accommodate the display medium 15.

In FIG. 2A, only nine layout units 21 are depicted for the convenience of explanation, only two of the layout units 22, 23, 24 and 25 are depicted, and only one of the layout units 26 and 27 at four corners is depicted. However, in actual fact, the amounts of layout units is not limited thereto.

In FIG. 2A, the area of one layout unit 21 at the center of the substrate is larger than the area of any one of the layout units 24 to 26 at the edge of the substrate. The areas of each of the layout units 22 to 27 at two lateral side edges of one of the substrates are equal to each other. For example, the areas of each of the layout units 24 and 25 at left and right lateral side edges of one of the substrates are equal to each other, and the areas of each of the layout units 22 and 23 at the upper and lower lateral side edges of the one of the substrate are equal to each other.

The widths and the heights of the layout units 21 to 27 gradually become high or wide from the center of the substrate to four sides thereof, the rates of the leftward and rightward changes are the same, and the rates of the upward and downward changes are the same. The gradually becoming high condition means that, for example, continuous rows of layout units have the same height (a first height), and the further upward or downward layout units become to have another height (a second height), and after becoming another height, continuous rows of layout units have the same height (the second height), and so on. The gradually becoming wide condition and the gradually becoming high condition are similar. For example, continuous columns of layout units have the same width (a first width), and the further leftward or rightward layout units become to have another width (a second width), and after becoming another width, continuous rows of layout units have the same width (the second width), and so on. Ellipses in the figure indicate the gradually becoming high condition and gradually becoming wide condition. Other layout units with different sizes are also disposed between the layout unit 21 and the layout units 22 to 27 according to the methods of the gradually becoming high condition and the gradually becoming wide condition.

For the layout units 22 to 27 at the edges of the substrate, the heights of the layout units in the top and bottom rows are the same, and the widths of the layout units in the leftmost and rightmost columns are the same. For the layout units 24 to 27 at the left and right edges of the substrate, the heights of the layout units are the same. For the layout units 22 to 23 and 26 to 27 at the upper and lower edges of the substrate, the widths of the layout units are the same.

With this configuration, the problem of easier depression at the central portion of the panel can be solved, and the problems that the photo spacers are distributed non-uniformly and the flat panel display easily produces defective pixels can also be improved.

Figure 2B:
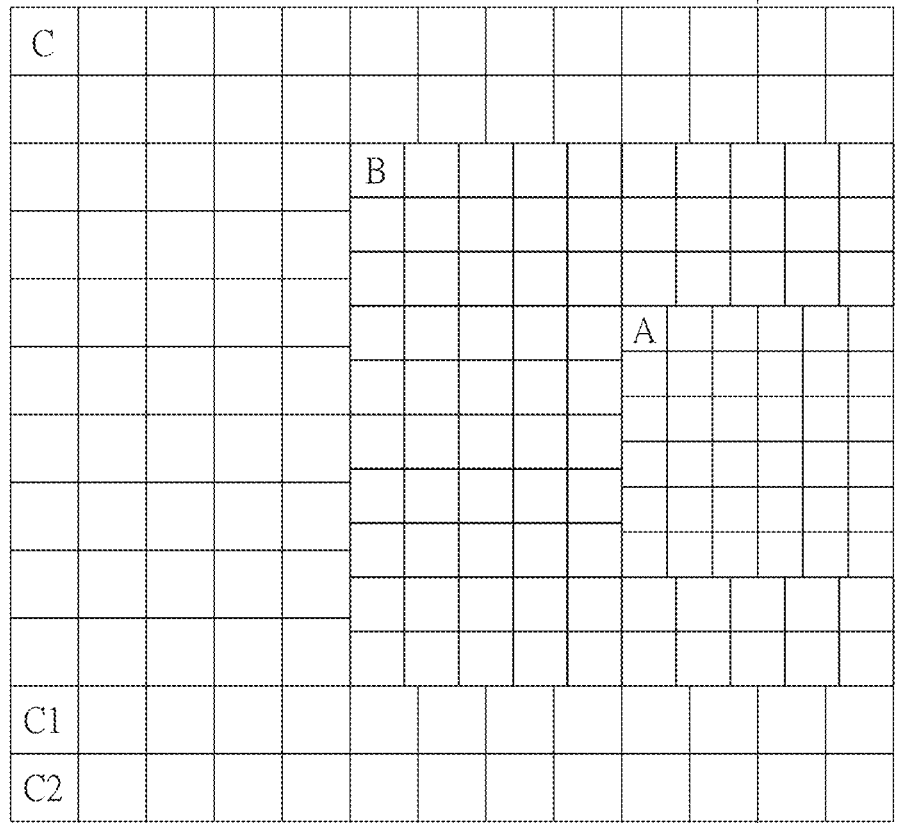

FIG. 2B shows an example of the configuration of the layout units. As shown in FIG. 2B, short chain lines indicate that the right half portion is symmetrical with the left half portion, so the right half portion is not shown in the figure. The layout units A, B and C have different sizes, the layout units A, B and C are disposed form the central portion to the outside, the heights of the layout units A, B and C are gradually becoming high, and the widths of the layout units A, B and C are gradually becoming wide. For example, the ratio of the widths of the layout units A, B and C is 10:12:15, and the ratio of the heights of the layout units A, B and C is 10:12:15.

In addition, the amounts of layout units may also be asymmetrical. For example, in the figure, there are three rows of layout units B above the layout unit A, and there are two rows of layout units B below the layout unit A. In addition, the amounts of the same layout units disposed in the rows and amounts may also be different from each other. For example, in the figure, the layout unit C has 22 columns (11 columns in the left half portion) and 12 rows in total, and this ratio is close to 16:9 to meet the high-definition television standards.

In addition, in a modified example, the heights of a few rows of layout units in the layout unit C are different. For example, in the row where the layout units C1 and C2 are located, the height of the layout unit may be lower than those of other layout units, so that the ratio of the widths of all 22 columns of layout units C to the heights of all 12 rows of layout units C is 16:9 to completely meet the high-definition television standards. In addition, it is also possible that only the lowest row of layout units C2 and the other layout units C have different heights.

Figure 2C:
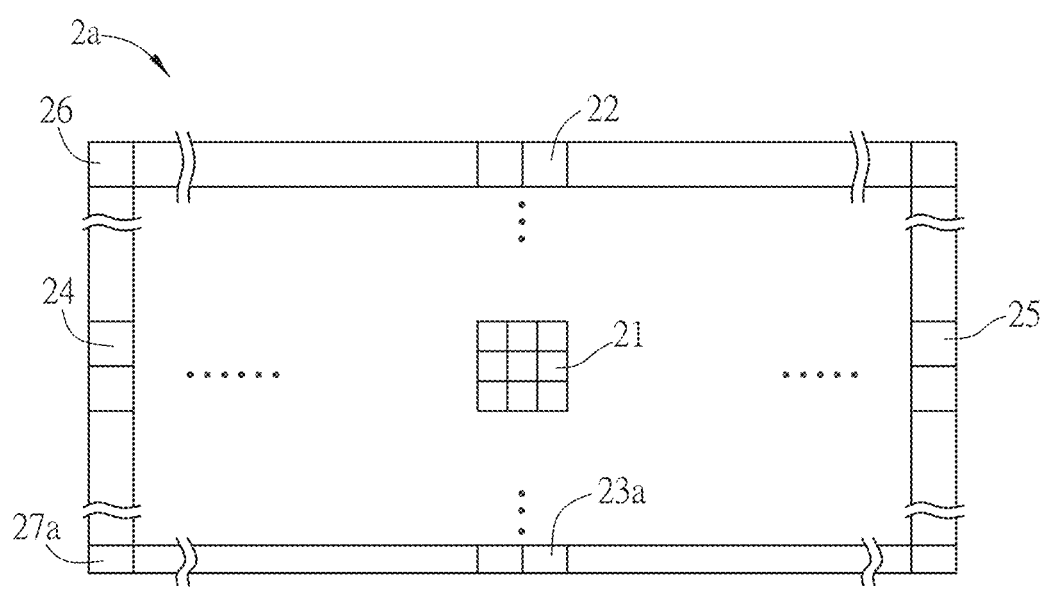

In FIG. 2C, what is different from FIG. 2A is that an area of a layout unit 22 at the top edge of one of the substrates is larger than an area of a layout unit 23a at the bottom edge of the same substrate. Similarly for the layout unit at the corner, an area of a layout unit 26 at the top edge of the substrate is larger than an area of a layout unit 27a at the bottom edge of the same substrate. In addition, an area of one of the layout units 24 and 25 at two lateral side edges of one of the substrates is larger than an area of another layout unit 23a at the bottom edge of the same substrate.

For the layout units 21 to 27a, except for the widths and the heights gradually become high or become wide from the center of the substrate to the four sides thereof, the rates of the leftward and rightward changes are the same, the rates of the upward and downward changes are different, and the rate of the upward change is greater than the range of the downward change, so that the area of the layout unit 26 at the top edge of one of the substrates is larger than the area of the layout unit 27a at the bottom edge of the same substrate. For the layout units 22 to 27a at the edges of the substrate, the heights of the layout units at the same row are the same, and the widths of the layout units on the same column are the same. For the layout units 24 to 27a at the left and right edges of the substrate, the heights of the layout units 24 and 26 on the upper half portion of the substrate are the same, the heights of the layout units 27a on the lower half portion of the substrate are different, and the heights of the layout units 23a and 27a closer to the bottom are shorter. For example, the heights of the layout units 23a and 27a on the bottom are still the same as the height of the layout unit 21 at the center.

With the above-mentioned configuration, the structural strength of the lower edge of the display device can be improved, and the problems that the photo spacers are distributed non-uniformly and the flat panel display easily produces defective pixels can also be improved.

In addition, in the above-mentioned embodiment, the heights of three central layout units 21 are equal to the heights of two layout units 24 and 25 in the same horizontal direction, and the widths of three central layout units 21 are equal to the widths of two layout units 22 and 23 in the same vertical direction. The above ratio of the height to the width is taken as an example, and it can be appropriately changed to other available ratios.

Figure 3A:
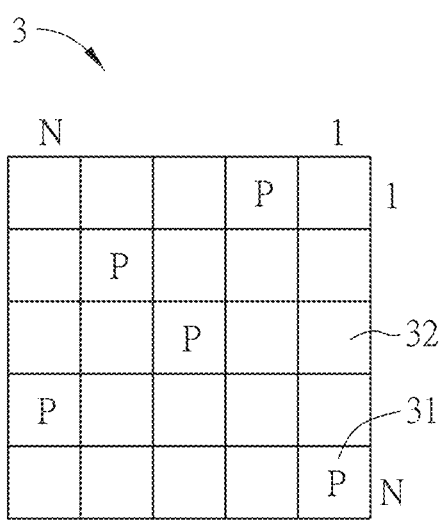
FIGS. 3A to 3C are schematic views showing one embodiment of a layout unit of this disclosure.
Figure 3B:
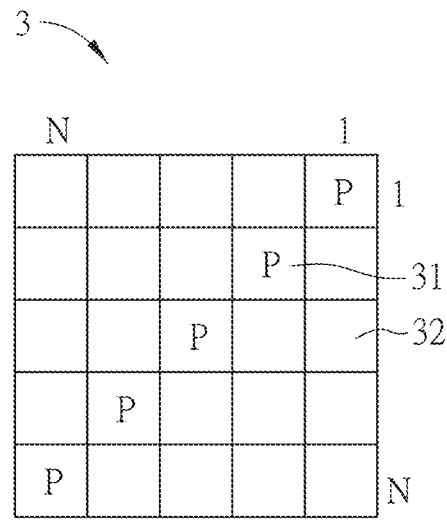
Figure 3C:
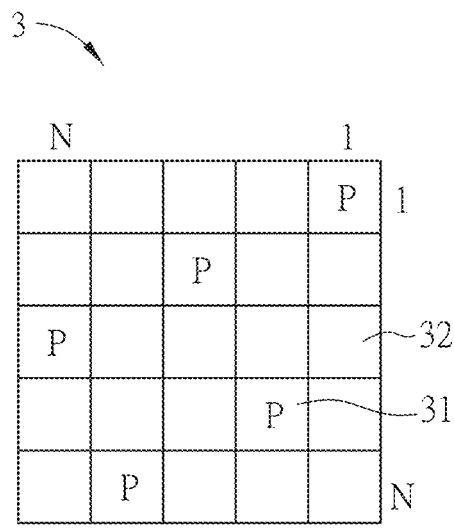

In the above-mentioned embodiment, the layout unit may consist of N by N layout subunits disposed in rows and columns, this configuration may refer to the examples of FIGS. 3A, 3B and 3C, but the configuration is not limited to the examples of the above-mentioned figures. The layout unit may also consist of N by M layout subunits disposed in rows and columns (N is unequal to M), this configuration may refer to the examples of FIGS. 5A and 5B, but the configuration is not limited to the examples of the above-mentioned figures.

In addition, with the layout unit gradually becoming high or gradually becoming high and wide, the layout subunits gradually become high or gradually become wide with the ratio of the layout units. In one embodiment, for all the layout units, the amounts of rows and columns of the layout subunits in each layout unit are equal. The layout units with different sizes still have the same amounts of photo spacers.

FIGS. 3A to 3C are schematic views showing one embodiment of a layout unit of this disclosure. As shown in FIGS. 3A to 3C, a layout unit 3 consists of N by N layout subunits 31 and 32 disposed in rows and columns. The examples of FIGS. 3A to 3C are explained with N equal to 5, but N may also be other positive integers and is not limited to 5. Illustrations are made by configuring N photo spacers in the drawing, P is marked on the drawing and on the layout subunit 31 provided with a photo spacer, the drawing corresponding to the layout subunit 32 not provided with a photo spacer is kept blank. In one layout unit 3, only one of the layout subunits 31 and 32 on the same row is provided with a photo spacer. In one layout unit 3, and only one of the layout subunits 31 and 32 on the same column is provided with a photo spacer.

In this embodiment, N photo spacers are arranged in N×N layout subunits 31 and 32, and each layout unit 3 is arranged repeatedly according to such an arrangement method to fill the entire panel. Due to the size of the area of the photo spacer, it is still necessary to consider that the layout subunits 31 and 32 are still light-permeable, so the area of the photo spacer provided in a layout subunit 31 is smaller than the area of the layout subunit 31, and the entire layout subunit 31 is not be fully filled.

In FIG. 3A, 5 photo spacers P are respectively disposed in different columns and different rows. In this embodiment, the arrangement method of the photo spacer P has no specific rule, and in one layout unit 3, there is only one photo spacer P in the same row and the same column. In addition, the layout unit 3 may also have different arrangement aspect as shown in FIGS. 3B and 3C.

In addition, modified arrangements may present between different layout units 3, as shown in FIGS. 3B and 3C. In FIG. 3B, different rows of photo spacers are arranged at the layout subunit 31 in every other column, in FIG. 3C, different rows of photo spacers are arranged on the layout subunit 31 in every second column. Analogically, every other layout unit 3, the amounts of columns or rows between the photo spacers is increased by 1.

In summary, the flat panel display of this disclosure is divided into the layout units with a plurality of photo spacers, the layout units having the same amounts of photo spacers are provided between the substrates, an area of a layout unit at the center of the substrate is larger than an area of a layout unit at the edge of the substrate, and thus the problem of easier depression at the central portion of the panel can be solved. In addition, the layout units each having the same amounts of photo spacers are provided between the substrate, an area of a layout unit at the top edge of one of the substrate is larger than an area of a layout unit at the bottom edge of the same substrate, and the structural strength of the lower edge of the display device can be improved. With the above-mentioned configuration, the problems that the photo spacers are distributed non-uniformly and the flat panel display easily produces defective pixels can also be improved.

Figure 4:
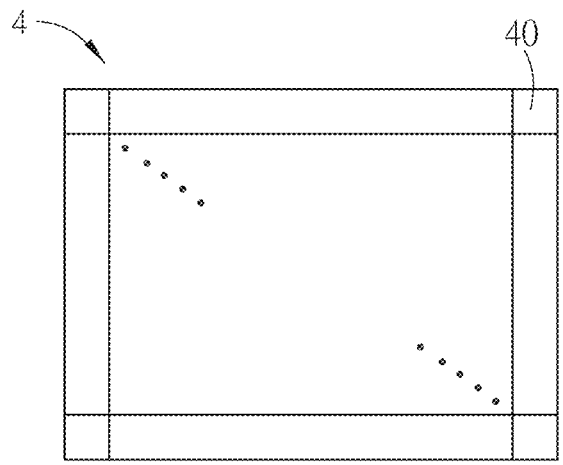
FIG. 4 is a schematic view showing one embodiment of a photo spacer region of this disclosure.

FIG. 4 is a schematic view showing one embodiment of a photo spacer region of this disclosure. FIG. 4 shows a top view configuration of the photo spacer region 4 on the flat panel display. As shown in FIG. 4, a plurality layout units are distributed in a photo spacer region 4, and the layout units are disposed between the first substrate 11 and second substrate 18 as shown in FIG. 1B. The layout units 40 have the photo spacers as shown in FIG. 1B between the first substrate 11 and the second substrate 18, and a fixed distance is provided between the first substrate 11 and the second substrate 18, such that a display medium 15 can be accommodated between the first substrate 11 and the second substrate 18. Each layout unit 40 can have the same amounts of photo spacers disposed between the first substrate 11 and the second substrate 18. In FIG. 4, each of the layout units 40 has the same size.

Figures 5A, 5B:
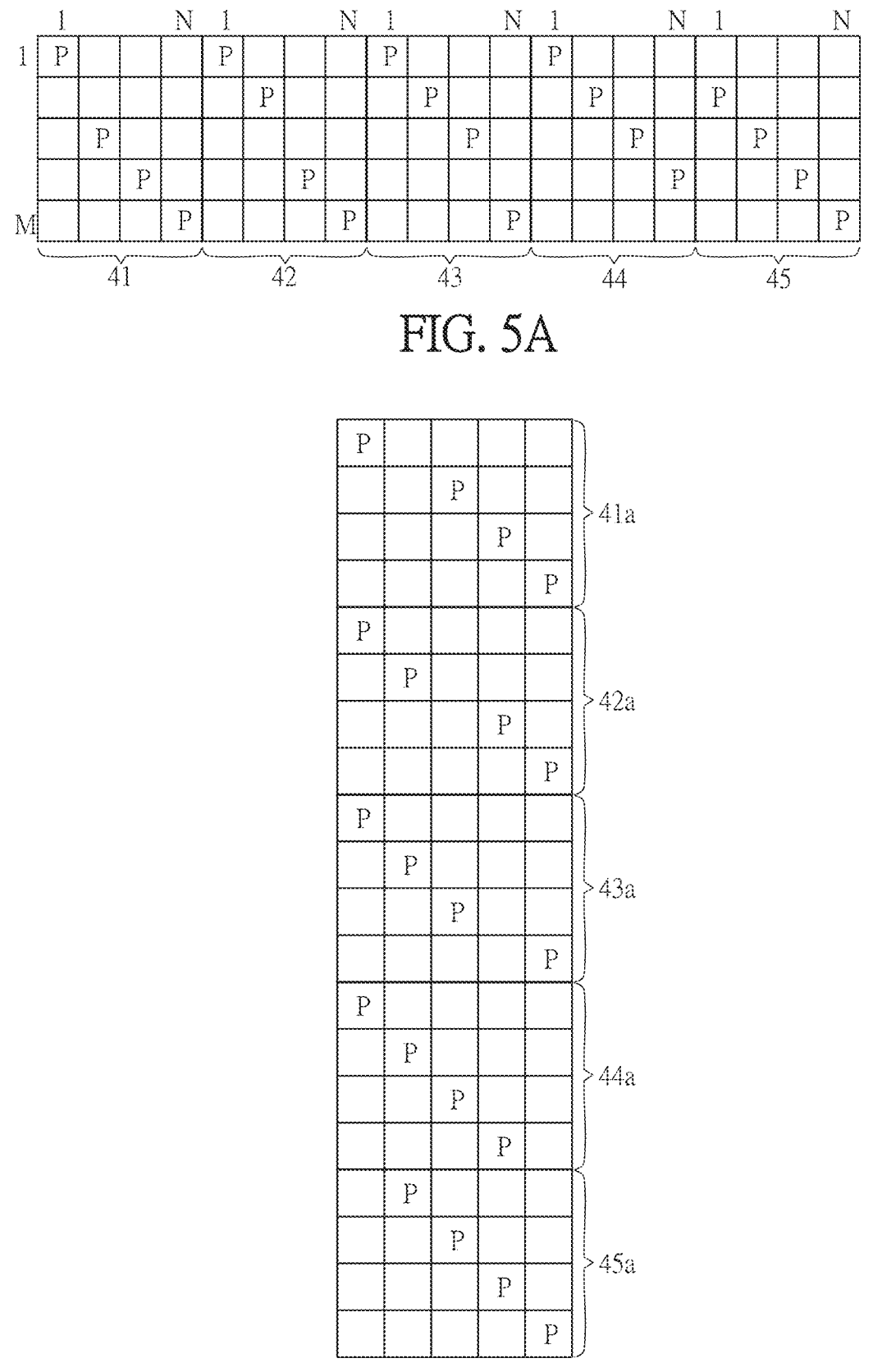

FIGS. 5A and 5B are schematic views showing the embodiment of the layout unit 40 in FIG. 4. Referring to FIG. 5A, for the convenience of explanation, symbols 41 to 45 FIG. 5A corresponding to the layout units 40 in FIG. 4 are respectively used to label the layout units at different positions. The layout units 41 to 45 are constituted by a plurality of layout subunits disposed in rows and columns. In one of the layout units 41 to 45, portions of the layout subunits are provided with photo spacers P, one of the columns or one of the rows of layout subunits are not provided with photo spacers. The layout units 41 to 45 may have the same amounts of photo spacers P.

In FIG. 5A, in one of the layout units 41 to 45, at most one of the layout subunits on the same row is provided with a photo spacer P, and at most one of the layout subunits on the same column is provided with a photo spacer P. In one of the layout units 41 to 45, one of the rows of layout subunits are not provided with photo spacers. The empty row without the photo spacer switches between different columns of layout units 41 to 45, and the switched amounts of row is, for example, 1. On each row of the photo spacer region, the amounts of layout subunit provided with the photo spacers are the same. For example, in the layout units 41 to 45, each row has four photo spacers P in total.

As shown in FIG. 5B, what is different from FIG. 5A is that in one of the layout units 41a to 45a, one of the columns of the layout subunits are not provided with photo spacers. In the layout units 41a to 45a on the same row, the empty column without the photo spacer switches between different rows of layout units 41a to 45a, and the switched amounts of column is, for example, 1. On each column of the photo spacer region, the amounts of the layout subunits provided with the photo spacers P are the same. For example, each column of the layout units 41a to 45a has four photo spacers P in total.

In summary, the flat panel display of this disclosure is divided into the layout units with a plurality of photo spacers, and the layout unit is constituted by a plurality of layout subunits disposed in rows and columns; and in one layout unit, some of the layout subunits are provided with photo spacers, one of the columns or one of the rows of layout subunits is not provided with a photo spacer. Thus, the non-uniform distribution of the photo spacers is improved, the aperture ratio of the pixel is increased, the light source availability is enhanced, and the display efficiency is enhanced.

In the above-mentioned embodiment, a layout unit of photo spacer region may cover a plurality of pixels 14 in the pixel matrix DM, as shown in FIG. 1A. In one layout unit, some of the layout subunits are provided with photo spacers, and the remaining layout subunits are not provided with photo spacers. Thus, this can cause some of the pixels 14 to have the photo spacers, and some of the pixels 14 to have no photo spacer, and thus causing different pixels 14 to have different luminance control capacities.

Figure 6A:
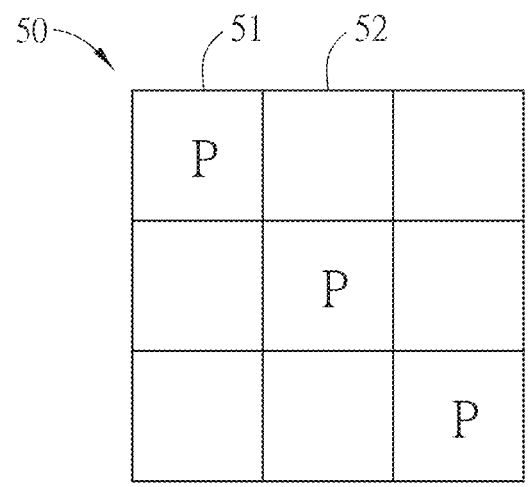
FIG. 6A is a schematic view showing one embodiment of a layout unit of a photo spacer region of this disclosure.

FIG. 6A is a schematic view showing one embodiment of a layout unit of a photo spacer region of this disclosure. As shown in FIG. 6A, one layout unit 50 covering 9 pixels is taken as an example here. It is also possible to cover other amounts of pixels in different implementations, and the amounts of pixels covered by the layout unit 50 is not limited to 9. The layout unit 50 may be constituted by a plurality of layout subunits disposed in rows and columns, as shown in the above-mentioned embodiment, and the way of implementation may be as the content in the above-mentioned embodiment, so detailed descriptions thereof will be omitted. In FIG. 6A, some pixels 51 of the pixel matrix have photo spacers P, and some pixels 52 do not have photo spacers.

The flat panel display may comprise a compensation driving module which is configured to drive the luminance compensation to the pixels 51 and 52 to solve the problem of non-uniform luminance capacities. The compensation driving module which is configured to drive the luminance compensation to the pixel 51 which is provided with the photo spacers P, or to the pixel 52 which are not provided with the photo spacers. For example, the luminances of the pixel 51 which are provided with the photo spacers P are compensated, and the luminances of the pixel 52 which are not provided with the photo spacers are not compensated; or the luminances of the pixel 52 which are not provided with the photo spacers are compensated, and the luminances of the pixel 51 which are provided with the photo spacers P are not compensated. The luminance compensation is to equalize the luminance capacities controlled by the pixels 51 and 52.

Figure 6B:
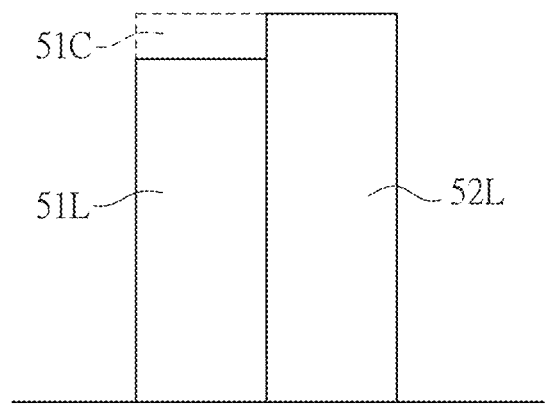
FIG. 6B is a schematic view showing one embodiment of a luminance amount of a pixel of this disclosure.

FIG. 6B is a schematic view showing one embodiment of a luminance amount of a pixel of this disclosure. As shown in FIG. 6B, under the same displayed grayscale, the pixels 51 and 52 originally have different luminance control capacities 51L and 52L. After the luminance compensation 51C is performed on the pixels 51 and 52, the pixels 51 and 52 having different luminance capacities due to the absence of the photo spacer have the same controlled luminance capacity. The luminance compensation method is, for example, under the same displayed grayscale, grayscale values which are written into the pixels which are provided with the photo spacers are different from those written into the pixels which are not provided with the photo spacers.

Figure 7A:
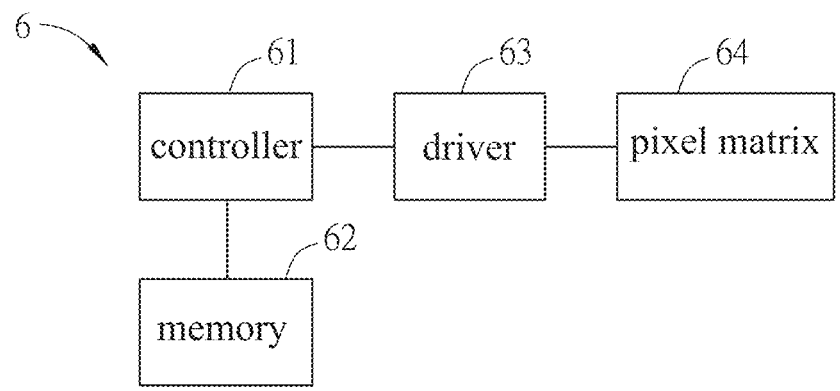
FIG. 7A is a block view showing one embodiment of a flat panel display of this disclosure.

FIG. 7A is a block view showing one embodiment of a flat panel display of this disclosure. As shown in FIG. 7A, a flat panel display 6 comprises a controller 61, a memory 62, a driver 63 and a pixel matrix 64. The controller 61 is coupled to the memory 62, the driver 63 is coupled to the controller 61, and the pixel matrix 64 is coupled to the driver 63.

The pixel matrix 64 is, for example, the pixel matrix DM of FIG. 1A, and the pixel of the pixel matrix 64 is, for example, the pixel 14 of the FIG. 1C, so detailed descriptions thereof will be omitted.

The compensation driving module may be implemented in the controller 61 or the data driver 63. For example, the controller 61 transmits the image data of the frame to the driver 63, and the driver 63 is, for example, the driver of the area 17 in FIG. 1A, and write the gray scale data of the pixel to the pixel of the pixel matrix 64. Because different pixels need different luminance compensations, the memory 62 may store a compensation table, as listed in FIG. 7B, and different gains or corrections are provided for different pixels. For example, the compensation value for the pixel 51 with the photo spacer P is 1.1, and the compensation value for the pixel 52 without the photo spacer is 1, and the compensation value of 1 represents no special treatment, the compensation value greater than 1 represents the enhanced compensation, and the compensation value smaller than 1 represents the weakened compensation. The controller 61 may multiply different compensation values by the pixel gray scale value of the frame image data according to whether the pixel has the photo spacer or not, and outputs the gray scale value multiplied by the compensation value to the driver 63, and the driver 63 transmits the compensated gray scale value to the corresponding pixel.

In summary, the liquid crystal display device in this embodiment comprises: two substrates disposed opposite to each other; a liquid crystal layer disposed between the substrates; a photo spacer region where a plurality layout units are distributed, and the layout units are disposed between the substrates, and the layout unit is constituted by a plurality of layout subunits disposed in rows and columns, and in one layout unit, some of the layout subunits are provided with photo spacers, and the remaining layout subunits is not provided with a photo spacer; a pixel matrix comprising a plurality of pixels, some of the pixels are provided with photo spacers, and other pixels are not provided with photo spacers; and a compensation driving module is configured to drive the luminance compensation to at least one of the pixels. In the liquid crystal display device of this disclosure, some pixels are provided with photo spacers, and some of the pixels are not provided with photo spacers. The compensation driving module is configured to drive the luminance compensation to at least one of the pixels, so that the pixels with and without photo spacers and having different luminance capacities are compensated to have the same controlled luminance capacity. Thus, the distribution of the photo spacer region improves the non-uniform distribution of the photo spacers, and increases the aperture ratio of the pixel. So, the light source availability is enhanced, the display efficiency is enhanced, and the circuit design is used to improve the defect of the non-uniform luminance capacities of the pixels.

FIG. 8A is a schematic view showing one embodiment of a touch display device of this disclosure. FIG. 8A shows the top view configuration showing the layout unit of the photo spacer region and the touch matrix on the touch display device. Referring to FIG. 8A, the layout unit 70 of the photo spacer region is constituted by a plurality of layout subunits disposed in rows and columns. In one layout unit 70, some of the layout subunits are provided with photo spacers P, and the remaining layout subunits are not provided with photo spacers. The arrangement of the photo spacers P of the layout unit 70 may refer to the above-mentioned embodiment, so detailed descriptions thereof will be omitted.

In FIG. 8A, a touch matrix comprises a plurality of touch units 71 and 72, which are disposed along the layout subunits provided with the photo spacers P. The layout subunits provided with the photo spacers P are arranged in a line segment, and the edges of the touch units 71 and 72 are disposed along the line segment. The main areas of the touch units 71 and 72 do not cover the photo spacers P. The main area corresponds to more than one half of the area region in one touch unit and is an area capable of providing the touch function. In the preferred embodiment, the main area occupies 75% or even more than 90% of the area region of one touch unit. In this embodiment, the main area is disposed at the central portion of one touch unit and extends toward the periphery, and four edges are overlapped with the photo spacers P. In another embodiment, the main area may be disposed at the central portion of one touch unit and extends toward the periphery, and some of the edges are overlapped with the photo spacers P, and some of the edges are not overlapped with the photo spacers P.

In one layout unit 70, at most two of the layout subunits on the same column are provided with photo spacers P. In one layout unit 70, at most two of the layout subunits on the same row are provided with photo spacers P.

FIG. 8B is a schematic view showing one embodiment of a touch display device of this disclosure. FIG. 8B shows the top view configuration showing the layout unit of the photo spacer region and the touch matrix on the touch display device. Referring to FIG. 8B, what is different from FIG. 8A is that the touch units 71 of FIG. 8A are disposed along the layout subunits of one layout unit 70 provided with the photo spacers P, while the touch units 71a of FIG. 8B are disposed along the layout subunits of four layout units 701 to 704 provided with the photo spacers P. In FIG. 8B, in one of the layout units 701 to 704, at most one of the layout subunits on the same column is provided with a photo spacer P. In one of the layout units 701 to 704, at most one of the layout subunits on the same row is provided with a photo spacer P.

In summary, the touch display device of this embodiment comprises: two substrates disposed opposite to each other; a display medium disposed between the substrates; a photo spacer region where a plurality layout units are distributed, and the layout units are disposed between the substrates, and the layout unit is constituted by a plurality of layout subunits disposed in rows and columns, and in one layout unit, some of the layout subunits are provided with photo spacers, and the remaining layout subunits is not provided with a photo spacer; and a touch matrix comprising a plurality of touch units disposed along the layout subunits provided with the photo spacers. The touch display device of this disclosure is divided into the layout units with a plurality of photo spacers, the layout units have the same amounts of photo spacers disposed between the substrates, the layout unit is constituted by a plurality of layout subunits disposed in rows and columns. In one layout unit, some of the layout subunits are provided with photo spacers, and the remaining layout subunits is not provided with a photo spacer. Thus, the non-uniform distribution of the photo spacers is improved, the aperture ratio of the pixel is increased, the light source availability is enhanced, and the display efficiency is enhanced. The touch units of the touch matrix are disposed along the layout subunits provided with the photo spacers, so that the touch effect can be enhanced. Therefore, with the above-mentioned configuration, the touch display device improves the problem and generates the effect, and further has the better touch effect.

Figure 9A:
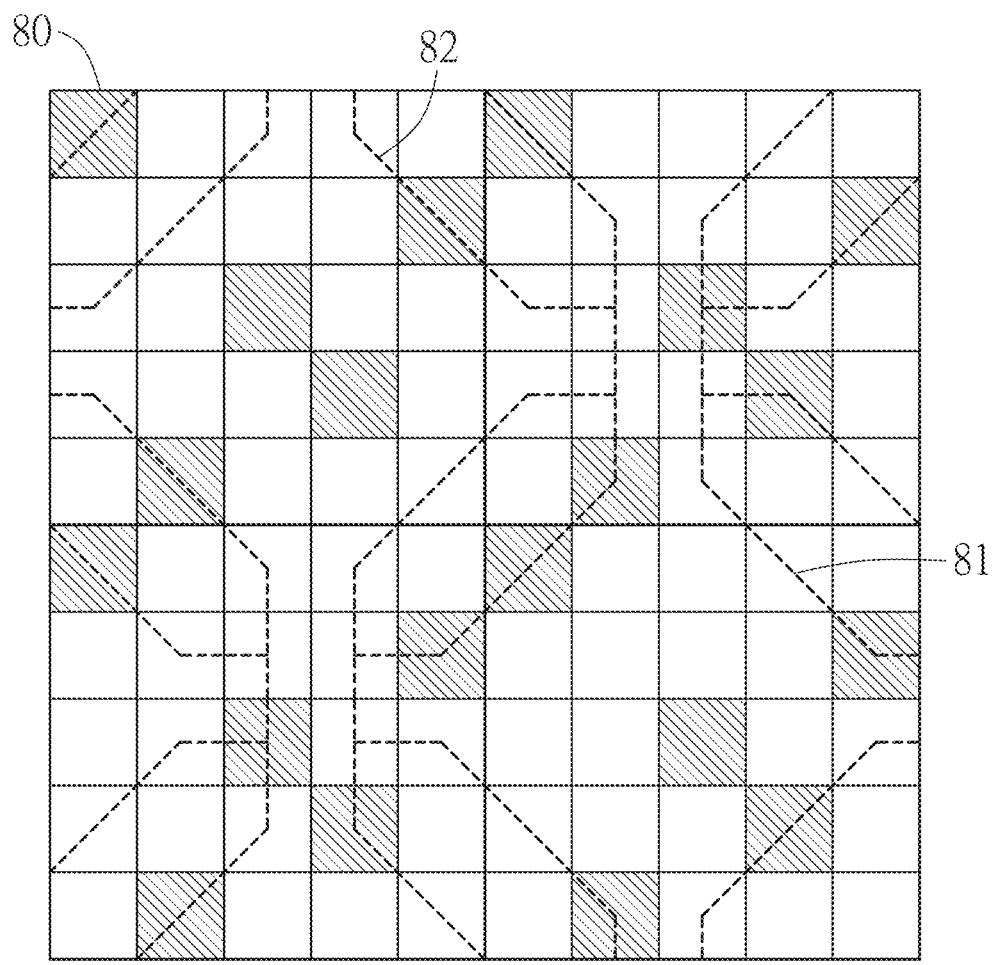
FIG. 9A is a schematic view showing one embodiment of a touch display device of this disclosure.

FIG. 9A is a schematic view showing one embodiment of a touch display device of this disclosure. As shown in FIG.

9A, a touch display device comprises a photo spacer region and a touch matrix, the photo spacer region has a plurality of layout units 80, and the touch matrix comprises a plurality of touch units 81 and 82. In addition, the touch display device may have two substrates and a liquid crystal layer, and the substrates and the liquid crystal layer may refer to the descriptions of the above-mentioned embodiment, so detailed descriptions thereof will be omitted.

The layout unit 80 is constituted by a plurality of layout subunits disposed in rows and columns. In one layout unit 80, some of the layout subunits are provided with photo spacers P, and the remaining layout subunits have no photo spacer. Because the implementation of the layout unit 80 may refer to the layout unit of the above-mentioned embodiment, detailed descriptions thereof will be omitted.

In FIG. 9A, the touch units 81 and 82 cover different amounts of photo spacers P, thereby causing different touch detection capacities of different touch units 81 and 82. The touch display device may comprise a touch compensation module performing the touch compensations on the touch units 81 and 82, to solve the problem of the non-uniform touch detection capacities. The touch compensation module performs the touch compensation on the touch unit 81 covering the more photo spacers P, or the touch unit 82 covering the fewer photo spacers P. For example, the touch compensation or the more enhanced touch compensation is performed on the touch unit 81 covering the more photo spacers P, and the touch compensation or the weaker touch compensation is not performed on the touch unit covering the fewer photo spacers P; or the touch compensation is performed on the touch unit 82 covering the fewer photo spacers P, and the touch compensation is not performed on the touch unit 81 covering the more photo spacers P. The touch compensation is to equalize the touch detection capacities of the touch units 81 and 82.

Figure 9B:
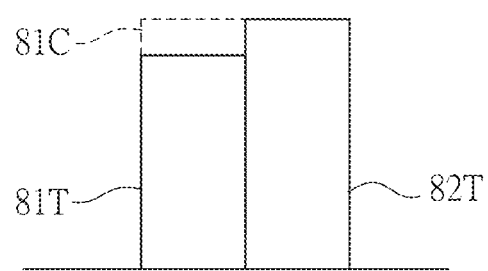
FIG. 9B is a schematic view showing one embodiment of the touch detection capacity of this disclosure.

FIG. 9B is a schematic view showing one embodiment of the touch detection capacity of this disclosure. As shown in FIG. 9B, the touch units 81 and 82 originally have different touch detection capacities 81T and 82T. After the touch compensation 81C is performed on the touch units 81 and 82, the touch units 81 and 82 originally having different touch detection capacities due to different amounts of the photo spacers have the same touch detection capacity.

For example, touch units 81 and 82 are touch excitation electrodes, the touch compensation is that the touch unit 81 covering the more photo spacers P is applied with the stronger touch drive signal, the touch unit 82 covering the fewer photo spacers P is applied with the weaker touch drive signal. If the touch units 81 and 82 are the touch excitation electrodes, then the configuration method different from that of FIG. 9A may present according to the design of the electrode. FIG. 9A depicts that different touch units cover different amounts of photo spacers, and does not restrict the arrangement form and function of the touch units.

In addition, touch units 81 and 82 are touch detection electrodes, for example. The touch compensation is, for example, that the touch detection signal outputted from the touch unit 81 covering the more photo spacers P is strengthened at a rate greater than that of the touch detection signal outputted from the touch unit 82 covering the fewer photo spacers P. If the touch units 81 and 82 are the touch detection electrodes, then the configuration method different from that of FIG. 9A may present according to the design of the electrode. FIG. 9A depicts that different touch units cover different amounts of photo spacers, and does not restrict the arrangement form and function of the touch units.

FIG. 10A is a block view showing one embodiment of a touch display device of this disclosure. As shown in FIG. 10A, a touch display device 9 comprises a controller 91, a memory 92, a driver 93, a touch matrix 94 and a detector 95. The controller 91 is coupled to the memory 92, the driver 93 and the detector 95 are coupled to the controller 91, and the touch matrix 94 is coupled to the driver 93 and the detector 95.

The touch compensation module may be implemented in controller 91 or the driver 93. For example, the controller 91 controls the driver 93 to transfer the touch drive signal to the touch unit of the touch matrix 94, and the detector 95 detects the presence or absence of a touch to generate a detection signal and transfers the detection signal to the controller 91. Since different touch units need different touch compensations, the memory 92 may store a compensation table shown in FIG. 10B, and there are different gains or corrections for different touch units. For example, the compensation value for the touch unit 81 with more photo spacers P is 1.1, and the compensation value for the touch unit 82 with less photo spacers is 1. The compensation value being 1 represents that no special treatment is performed, the compensation value greater than 1 represents that the enhanced compensation is performed, and the compensation value smaller than 1 represents that the weakened compensation is performed. The controller 91 may multiply the detection signal of the detector 94 by different compensation values according to the amounts of photo spacers of the touch unit, and the detection signal multiplied by the compensation value is used as the touch detection result. This treatment is shown in FIG. 11A, and the touch drive signals 81Tx and 82Tx for the touch units 81 and 82 originally sent from the driver 93 are the same. For the detection signal 81Rx for the touch unit 81 outputted from the detector 94, however, the controller 91 performs the touch compensation 81c, so that the touch detection result generated according to the touch unit 81 may be equal to the touch detection result generated according to the touch unit 82.

For example, the touch compensation may also be performed on the touch drive signal. The compensation table is shown in FIG. 10C, and there are different gains or corrections for different touch units. For example, the compensation value for the touch unit 81 with more photo spacer P is 1.1, and the compensation value for the touch unit 82 with less photo spacer is 1. The compensation value being 1 represents that no special treatment is performed, the compensation value greater than 1 represents that the enhanced compensation is performed, and the compensation value smaller than 1 represents the weakened compensation is performed. The controller 91 may multiply the touch drive signal of the driver 93 by different compensation values according to the amounts of photo spacers of the touch unit, and then the compensated touch drive signal is outputted to the touch unit of the touch matrix 94. This treatment is shown in FIG. 11B, and the touch drive signals 81Tx and 82Tx for the touch units 81 and 82 originally sent from the driver 93 are the same. For the touch unit 81, however, the touch compensation 81c is performed on the touch drive signal 81Tx outputted from the driver 93, so that the touch detection result generated according to the touch unit 81 may be equal to the touch detection result generated according to the touch unit 82.

In summary, the touch display device of this embodiment comprises: two substrates disposed opposite to each other; a display medium disposed between the substrates; a photo spacer region where a plurality layout units are distributed, and the layout units are disposed between the substrates, and the layout unit is constituted by a plurality of layout subunits disposed in rows and columns, and in one layout unit, some of the layout subunits are provided with photo spacers, and the remaining layout subunits is not provided with a photo spacer; and a touch matrix comprising a plurality of touch units covering different amounts of photo spacers; and a touch compensation module performing the touch compensations on the touch units. The touch display device of this disclosure is divided into the layout units with a plurality of photo spacers, the layout units have the same amounts of photo spacers disposed between the substrates, the layout unit is constituted by a plurality of layout subunits disposed in rows and columns. In one layout unit, some of the layout subunits are provided with photo spacers, and the remaining layout subunits is not provided with a photo spacer. Thus, the non-uniform distribution of the photo spacers is improved, the aperture ratio of the pixel is increased, the light source availability is enhanced, and the display efficiency is enhanced. Some touch units of the touch matrix cover the photo spacers, and some touch units do not cover the photo spacers. Because the touch compensation module performs the touch compensation on the touch units, the touch units, originally having different touch detection capacities due to the presence or absence of the photo spacer, are compensated to have the same touch detection capacity, and the circuit design is applied to improve the defect of the non-uniform touch detection capacities of the touch units. Therefore, with the above-mentioned configuration, the touch display device improves the problem and generates the effect, and further has the better touch effect.

The above contents with the specific embodiments of the present invention is further made to the detailed description, and specific embodiments of the present invention should not be considered limited to these descriptions. Those of ordinary skill in the art for the present invention, without departing from the spirit of the present invention, can make various simple deduction or replacement, and should be deemed to belong to the scope of the present invention.

What is claimed is:

1. A flat panel display, comprising:
   two substrates disposed opposite to each other;
   a display medium disposed between the substrates;
   a photo spacer region, wherein a plurality of layout units are distributed on the photo spacer region, the layout units are disposed between the substrates, and the layout units gradually become wider or higher from a center portion to four sides of the substrate, the rates of the leftward and rightward changes of the layout units are the same, the rates of the upward and downward changes of the layout units are different, and the rate of the upward change of the layout units is greater than the range of the downward change; and
   wherein the area of one of the layout units at a top edge of one of the substrates is larger than the area of another layout unit at a bottom edge of the same substrate.

2. The flat panel display according to claim 1, wherein each layout unit has the same amounts of photo spacers disposed between the substrates.

3. The flat panel display according to claim 1, wherein the areas of the layout units at two lateral sides of each substrate are the same.

4. The flat panel display according to claim 1, wherein the area of one of the layout units at two lateral sides of one of the substrates is larger than the area of another layout unit at a bottom edge of the same substrate.

5. The flat panel display according to claim 1, wherein the photo spacer region provides a fixed distance between the substrates.

6. The flat panel display according to claim 1, wherein one of the layout units is constituted by N by N layout subunits disposed in rows and columns.

7. The flat panel display according to claim 6, wherein in one of the layout units, only one of the layout subunits at the same row is provided with a photo spacer.

8. The flat panel display according to claim 6, wherein in one of the layout units, only one of the layout subunits at the same column is provided with a photo spacer.

9. The flat panel display according to claim 1, wherein the display medium is liquid crystal.

10. The flat panel display according to claim 1, wherein the layout units comprise a plurality of layout subunits disposed in rows and columns, and in one of the layout units, a portion of the layout subunits are provided with a photo spacer, and the remaining portion of the layout subunits are not provided with a photo spacer.

11. The flat panel display according to claim 10, further comprising:
    a pixel matrix comprising a plurality of pixels, wherein some pixels are provided with the photo spacer, and other pixels are not provided with the photo spacer; and
    a compensation driving module which is configured to drive a luminance compensation to at least one of the pixels.

12. The flat panel display according to claim 11, wherein the compensation driving module is configured to drive the luminance compensation to the pixels which are provided with the photo spacers, or to the pixels which are not provided with the photo spacers.

13. The flat panel display according to claim 11, wherein luminances of the pixels which are provided with the photo spacers are compensated, and luminances of the pixels which are not provided with the photo spacers are not compensated.

14. The flat panel display according to claim 11, wherein luminances of the pixels which are not provided with the photo spacers are compensated, and luminances of the pixels which are provided with the photo spacers are not compensated.

15. The flat panel display according to claim 11, wherein the luminance compensation is to equalize luminance capacities controlled by the pixels.

16. The flat panel display according to claim 11, wherein, under the same displayed grayscale, grayscale values which are written into the pixels which are provided with the photo spacers are different from those written into the pixels which are not provided with the photo spacers.

17. The flat panel display according to claim 11, wherein the compensation driving module is implemented in a controller or a data driver.

18. The flat panel display according to claim 11, wherein the pixel comprises:
    a transistor switch; and
    a pixel capacitor coupled to the transistor switch, wherein a liquid crystal layer is disposed between two electrodes of the pixel capacitor.

* * * * *